United States Patent
Lohchab et al.

(10) Patent No.: US 12,530,379 B2
(45) Date of Patent: Jan. 20, 2026

(54) DATA NAVIGATION USER INTERFACE

(71) Applicant: ServiceNow, Inc., Santa Clara, CA (US)

(72) Inventors: Sonika Lohchab, San Diego, CA (US); Mohammad Hasan Alabandi, Santa Clara, CA (US); Cailiang Xu, San Diego, CA (US); Pramod Chandra Jvdn, Hyderabad (IN); Prabudha Agnihotri, Hyderabad (IN); Vasant Balasubramanian, Santa Clara, CA (US); Mingli Chiang, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 226 days.

(21) Appl. No.: 17/540,007

(22) Filed: Dec. 1, 2021

(65) Prior Publication Data

US 2023/0169097 A1    Jun. 1, 2023

(51) Int. Cl.
  *G06F 16/28*    (2019.01)
  *G06F 3/0482*   (2013.01)
  *G06F 16/23*    (2019.01)

(52) U.S. Cl.
  CPC .......... *G06F 16/287* (2019.01); *G06F 3/0482* (2013.01); *G06F 16/2393* (2019.01); *G06F 16/285* (2019.01); *G06F 16/288* (2019.01)

(58) Field of Classification Search
  CPC .... G06F 16/287; G06F 16/285; G06F 16/288; G06F 16/2393
  See application file for complete search history.

(56) References Cited

U.S. PATENT DOCUMENTS

| | | | |
|---|---|---|---|
| 6,321,229 B1 | 11/2001 | Goldman | |
| 6,591,295 B1 * | 7/2003 | Diamond | G06F 16/40 707/999.102 |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |

(Continued)

*Primary Examiner* — Vaishali Shah
(74) *Attorney, Agent, or Firm* — FLETCHER YODER, PC

(57) ABSTRACT

A computer-implemented method of presenting a graphical user interface (GUI) includes receiving an indication of a data object related to an enterprise and identifying one or more data classifications related to the data object and one or more relationship types between the data object and the one or more data classifications. Additionally, the computer-implemented method includes generating and presenting the GUI via a client device. The GUI includes a central section indicating the data object and one or more sections disposed around the central section. The one or more sections indicate the one or more data classifications and the one or more relationship types between the data object and the one or more data classifications.

17 Claims, 17 Drawing Sheets

(56) References Cited

U.S. PATENT DOCUMENTS

| | | |
|---|---|---|
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,887,133 B2 | 11/2014 | Behnia |
| 9,015,188 B2 | 4/2015 | Behne |
| 9,037,536 B2 | 5/2015 | Vos |
| 9,137,115 B2 | 9/2015 | Mayfield |
| 9,239,857 B2 | 1/2016 | Trinon |
| 9,323,801 B2 | 4/2016 | Morozov |
| 9,412,084 B2 | 8/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,659,051 B2 * | 5/2017 | Hutchins ............... G06F 16/211 |
| 9,792,387 B2 | 10/2017 | George |
| 9,852,165 B2 | 12/2017 | Morozov |
| 10,002,203 B2 | 6/2018 | George |
| 10,031,939 B2 * | 7/2018 | Rezaei .............. G06F 16/24522 |
| 10,229,178 B2 * | 3/2019 | Pasupathy ........... G06F 3/04842 |
| 10,262,209 B2 * | 4/2019 | Werner .................. G06V 20/52 |
| 10,497,393 B1 * | 12/2019 | Flowers ................ G06F 3/0604 |
| 11,055,885 B1 * | 7/2021 | Schwaiger ............ G06T 11/206 |
| 11,138,271 B1 * | 10/2021 | Morningstar ............ G06F 16/26 |
| 2005/0027732 A1 * | 2/2005 | Kalima .................. G06F 16/284 |
| 2008/0235627 A1 * | 9/2008 | Torning ................ G06F 3/0482 715/854 |
| 2008/0270462 A1 * | 10/2008 | Thomsen ............ G06F 16/2471 |
| 2013/0024931 A1 * | 1/2013 | Kim ....................... G06F 21/79 726/16 |
| 2014/0153832 A1 * | 6/2014 | Kwatra .................. G06T 11/00 382/195 |
| 2023/0045713 A1 * | 2/2023 | Wohlstadter ...... G01N 35/00722 |

\* cited by examiner

FIG. 8

DATA NAVIGATION USER INTERFACE

BACKGROUND

The present disclosure relates generally to a simplified data navigation user interface that facilitates navigation of records in a hierarchical structure of data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Data systems may present data via a user interface that includes tabs, tables, and other mechanisms that convey information about the data. In the context of an enterprise, the user interface may present data related to operations or processes, organizational units or entities, and/or other aspects of the enterprise. A user may navigate the user interface via the tabs, tables, and other mechanisms to view information about the enterprise. Such navigation may be cumbersome, and relationships between aspects of the enterprise may not be apparent. Accordingly, the user may spend a significant amount of time searching for information or determining relationships within the data. Additionally, the user interface may include detailed information about a particular subject within the enterprise, such as a human resources department of the enterprise. The detailed information may require additional analysis on the part of the user to determine relevant information about the particular subject. Furthermore, the data presented via the user interface may be static, such that the user is unable to interactively or intuitively navigate through the data or to affect the data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed below, a graphical user interface (GUI) may provide simplified navigation of data, such as data related to an enterprise or organization. The data may include data objects corresponding to records stored in a database (e.g., an enterprise database), fields or tables defined within the database, and/or relationships between the data objects. Additionally, the data objects may be organized into data classifications, and the relationships may be organized into relationship types. In the context of an enterprise, the data classifications may include, but are not limited to, entities, risks, controls, policies, open issues, and/or other suitable data classifications. The relationship types may generally be types of relationships between a particular data object and data classifications. For example, the relationship types may identify the particular data object as including other data objects within a data classification, applying to the other data objects within the data classification, being upstream (with respect to a data hierarchy or process flow) of the other data objects within the data classification, being downstream of the other data objects within the data classification, and/or other suitable relationship types.

The GUI may include visually defined and delineated sections (e.g., halves, quarters, wedges or slices, and so forth) used to facilitate the display of the particular data objects and the relationship types to efficiently present relationships between a particular data object and the other data objects. The sections may include minimal information to simplify the presentation of data and to better communicate relationships between aspects of an enterprise. Additionally, the GUI may include selectable options to allow the user to view additional information about portions of the GUI, such as information about the other data objects included in a particular data classification. The user may navigate to another data object and determine relationships associated with the other data object. Furthermore, the GUI may include selectable options to allow the user to add a data object to a particular data classification, to add a data classification to a particular relationship type, and/or to otherwise modify the data. Additionally, the GUI may be configurable to allow an enterprise to customize the GUI. For example, the GUI may include multiple views, and each view may include a customized amount of sections and specific information about a given data object and relationship types associated with the data object. Accordingly, the GUI described herein may facilitate viewing, navigation, and modification of a hierarchical structure of data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 is an embodiment of the data object GUI including the selectable option for viewing the data navigation GUI, in accordance with aspects of the present disclosure;

DETAILED DESCRIPTION

Figure 1:
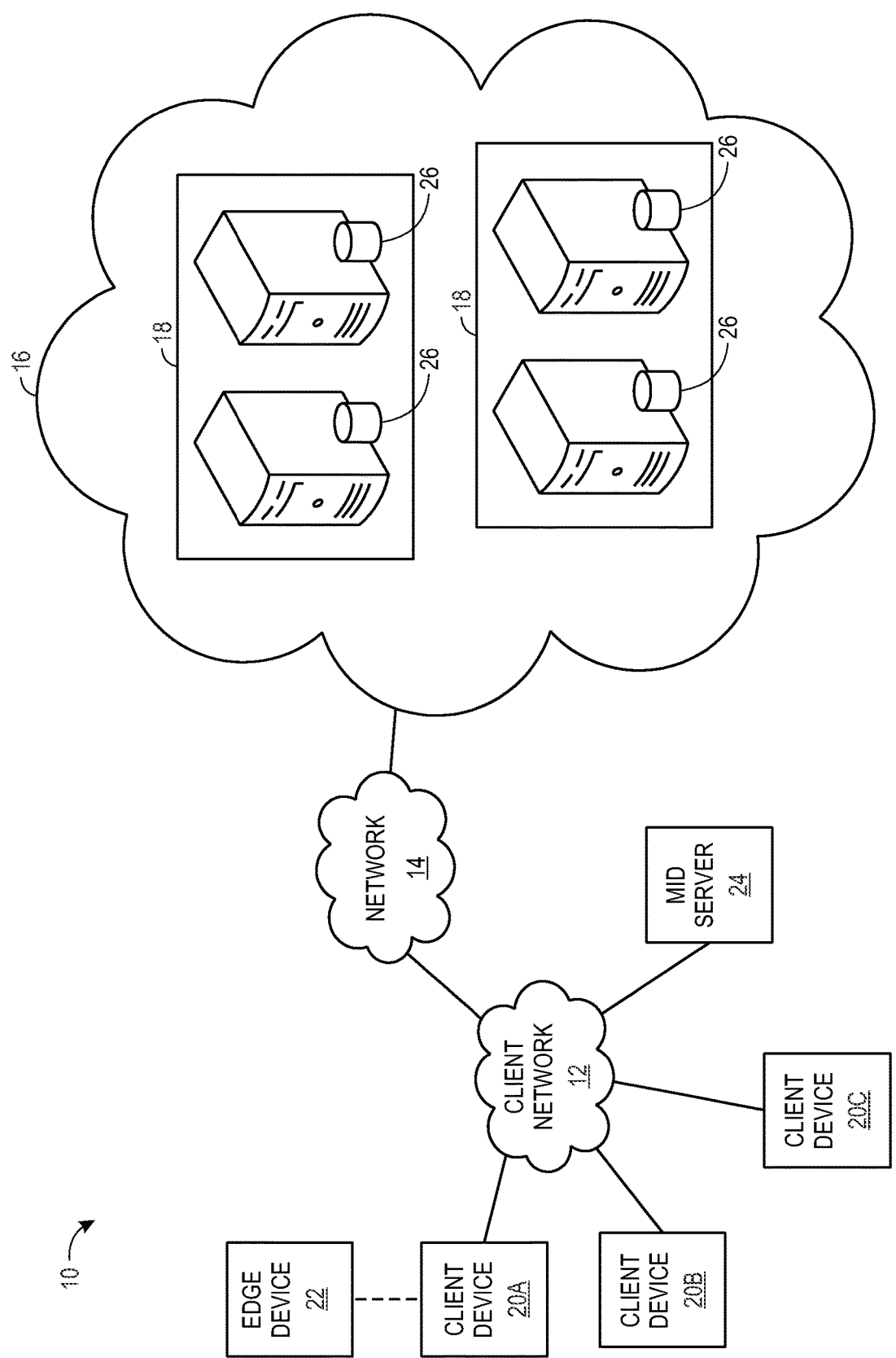
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include, but are not limited to, non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed herein, a data navigation graphical user interface (GUI) may provide simplified navigation of data, such as data objects related to an enterprise or organization. For example, a client device may generate and present the GUI based on records stored in a database (e.g., an enterprise database) and relationships between the data objects. Additionally, the data objects may be organized into data classifications, and the relationships may be organized into relationship types. In the context of an enterprise, the data classifications may include entities, risks, controls, policies, open issues, and/or other suitable data classifications. In the data classification of entities, each entity may be a data object. The relationship types may generally be types of relationships between a particular data object and data classifications. For example, a particular entity may include a data classification of open issues associated with the entity and may be upstream, in terms of a process flow or hierarchical arrangement, of a data classification of other entities.

The data navigation GUI may present the data objects and relationship types in a simplified manner that facilitates viewing, navigation, and modification of data associated with an enterprise. In particular, the data navigation GUI may include a central section that presents information about a data object and additional section(s) disposed around the central section that present information about data classifications related to the data object and types of relationships between the data object and the data classifications. Additionally, portions of the data navigation GUI may be selectable to enable viewing of other or different information associated with the data object, the data classifications, and the relationship types. For example, in response to a selection of a particular data classification, the data navigation GUI may present a table or other view indicating other data objects included in the selected data classification. Each of the other data objects may be selectable, and the data navigation GUI may update to present data classifications and relationship types associated with a newly selected data object. Additionally, the table may include a selectable option for generating, removing, and/or transferring data objects. Accordingly, a user may quickly view and navigate through the data objects to understand relationships between the data objects and other information associated with the enterprise.

Furthermore, a client device (e.g., a client device of the enterprise) may generate a configuration GUI that facilitates configuration and customization of the data navigation GUI. For example, the configuration GUI may receive inputs defining parameters of other configuration aspects of a view of the data navigation GUI and a table corresponding to the view, such as a table that indicates a type of data object to be displayed at the central section of the data navigation GUI. Additionally, the configuration GUI may receive an input configuring or parameterizing a section configuration of the data navigation GUI. The section configuration may indicate a pattern and/or an amount of additional sections to be displayed around the central section, relationship types to be associated with the additional sections, and other configuration information. In response to receiving inputs via the configuration GUI, the client device may generate a record indicative of the configuration of the data navigation GUI and store the record. Accordingly, an enterprise may customize the data navigation GUI, via the configuration GUI, to meet the needs of the enterprise.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
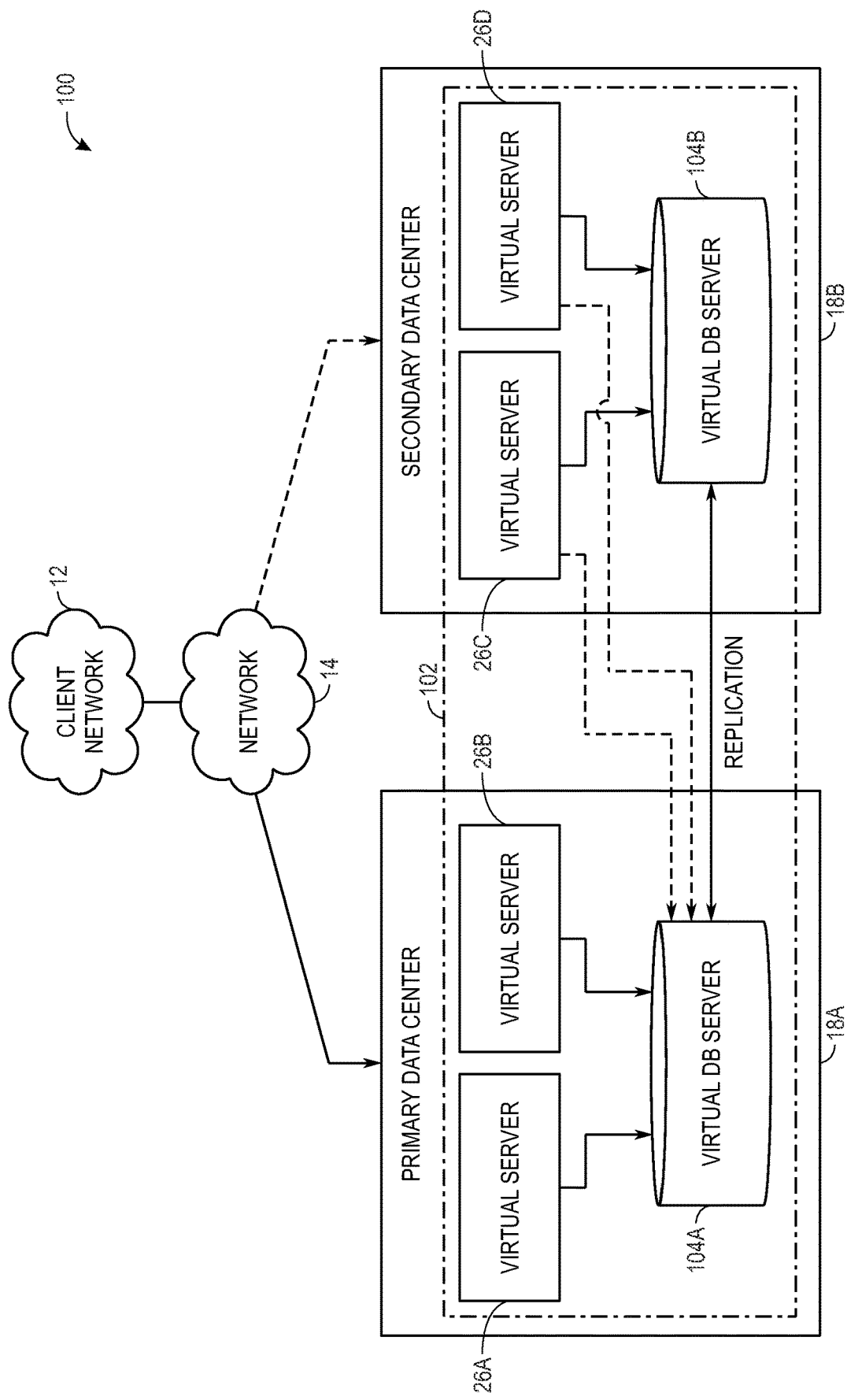
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
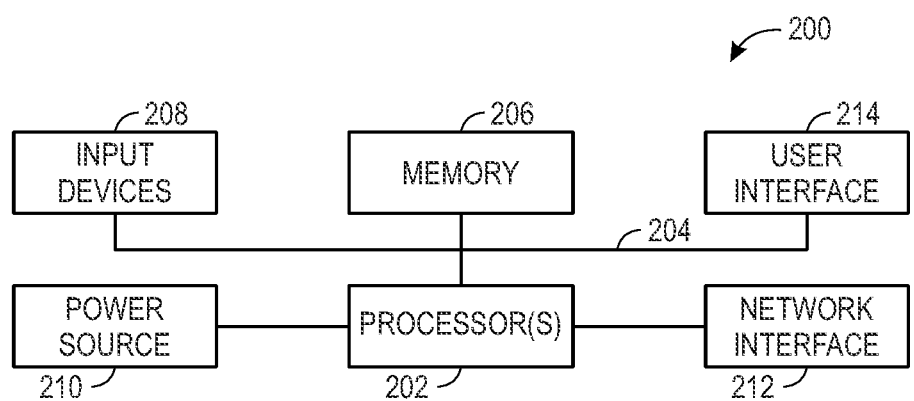
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
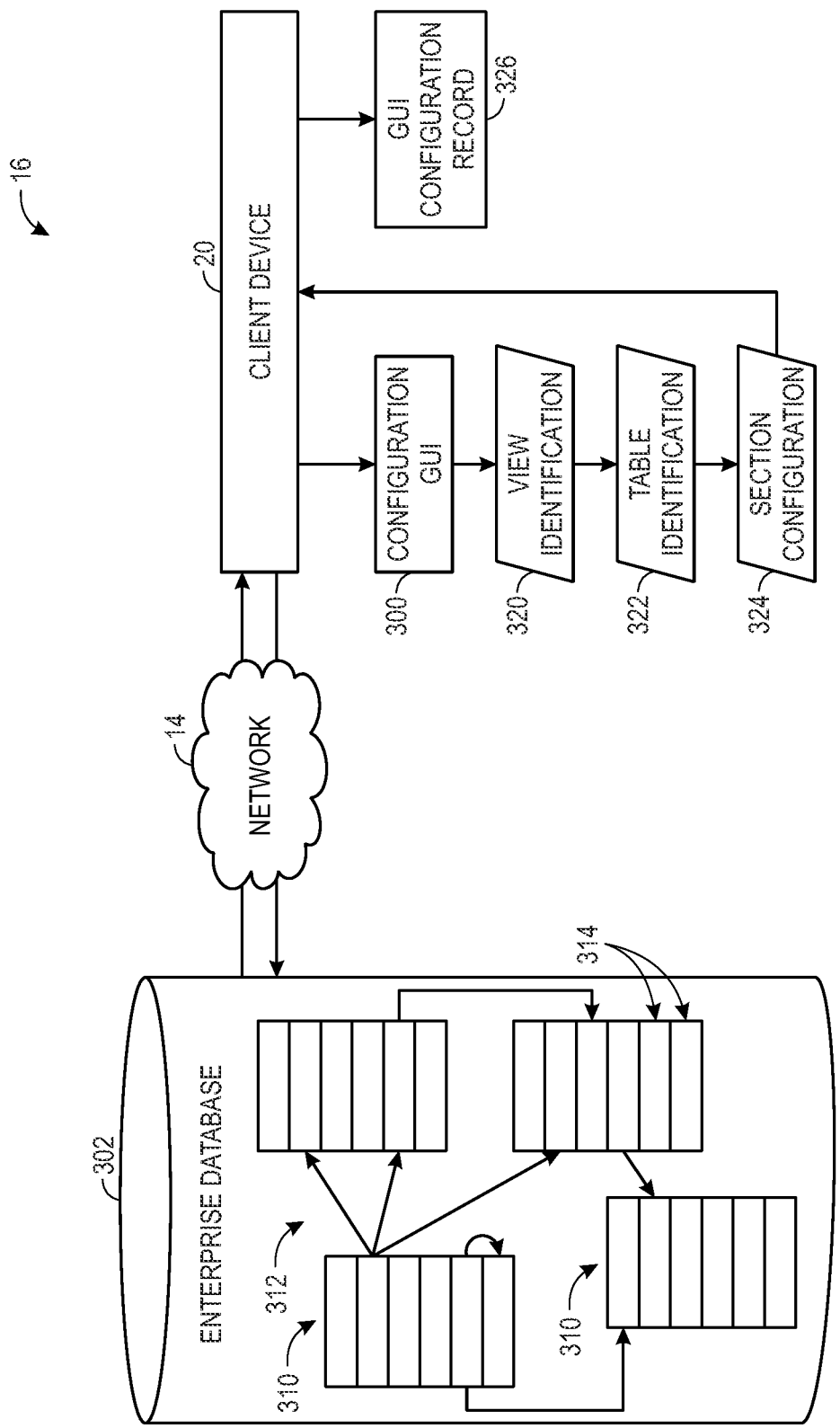
FIG. 4 is a flow diagram illustrating an embodiment in which a client device generates a configuration graphical user interface (GUI) that enables configuration of a data navigation GUI based on data retrieved from an enterprise database, in accordance with aspects of the present disclosure.

With the preceding in mind, FIG. 4 is a flow diagram illustrating an embodiment in which a client device 20 may generate and present a configuration graphical user interface (GUI) 300 that enables configuration of a data navigation GUI based on data retrieved from an enterprise database 302. More specifically, FIG. 4 illustrates an example of a portion of a service provider cloud infrastructure, including the cloud-based platform 16 discussed above. The cloud-based platform 16 is connected to the client device 20 via the network 14 to provide an interface for network applications executing via a client portal on the client device 20 and/or within other portions of a client instance (e.g., the client instance 102 of FIG. 2). Furthermore, the enterprise database 302 may be stored on a virtual database server of the client instance (e.g., the virtual database server 104A and/or 104B of FIG. 2). An embodiment of the configuration GUI 300 is shown and described in reference to FIG. 5. Additionally, an embodiment of a data navigation GUI 400 that may be configured via the configuration GUI 300 is shown and described in reference to FIG. 6.

As illustrated, the enterprise database 302 includes tables 310 and relationships 312 (e.g., indications of the relationships, relationship records indicative of the relationships) between the tables 310. More specifically, each table 310 includes records 314, and each relationship 312 may be between two or more records 314. For example, each record 314 may be associated with (e.g., have a relationship 312 with) one or more records 314 of another table 310, another record 314 of the same table 310, and/or records 314 of multiple other tables 310. In certain embodiments, a record 314 may not have a relationship 312 with another record 314.

Each table 310 may generally correspond to a type of record 314 and/or a data classification (e.g., a type of data object). As used herein, a "data object" may refer to a collection of data, such as one record 312 of a table 310, a collection of records 314 of a table 310, a collection of records 314 of multiple tables 310, and/or a collection of records 314 of the enterprise database 302 and record(s) of another suitable database. In the context of an enterprise, the tables 310 may correspond to data classifications including entities, policies, risks, controls, and other suitable data classifications. The records 314 may indicate specific data objects of the enterprise, such as employee records, payroll records, budget records, resource planning records, and/or other suitable records associated with an enterprise. In certain embodiments, a data object may generally refer to a department of the enterprise (e.g., human resources, finance, manufacturing) or a portion of the department. In some embodiments, the records 314 may include information technology (IT) records, such as records indicating open issues associated with IT components of the enterprise, and/or the enterprise database 302 may include a CMDB.

The client device 20 may retrieve data from the enterprise database 302 to generate and display the configuration GUI 300. For example, in response to receiving a request to present the configuration GUI 300, the client device 20 may request information from the enterprise database 302, such as data classifications of the tables 310. As described above, the data classifications may include entities, policies, risks, and/or controls in the context of an enterprise. In reference to FIG. 5, the client device 20 may generate the configuration GUI 300 to include a data object portion 340 for receiving inputs regarding a selection of a particular data classification (e.g., a type of data object) and/or other information to be displayed regarding a particular data object of the data classification. The data object portion 340 may generally identify information regarding a data object of the selected data classification to be displayed at a central section 402 of the data navigation GUI 400. For example, the data object portion 340 includes a table entry field 342 for identifying a table 310 (e.g., a particular data classification of data objects) of the enterprise database 302. As illustrated, the table entry field 342 is a drop-down menu enabling selection of a table from the multiple available tables 310 stored in the enterprise database 302. In other embodiments, the table entry field 342 may be a search and/or text field. The data object portion 340 also includes entry fields 344 for identifying information associated with the data object to be displayed at the central section 402 of the data navigation GUI 400. In the illustrated embodiment, inputs received via the entry fields 344 include a name and a class of the data object, such that the central section 402 of the data navigation GUI 400 may display the name and the class of the data object. The entry field 344 are also drop-down menus but may be search and/or text fields in other embodiments.

Figure 6:
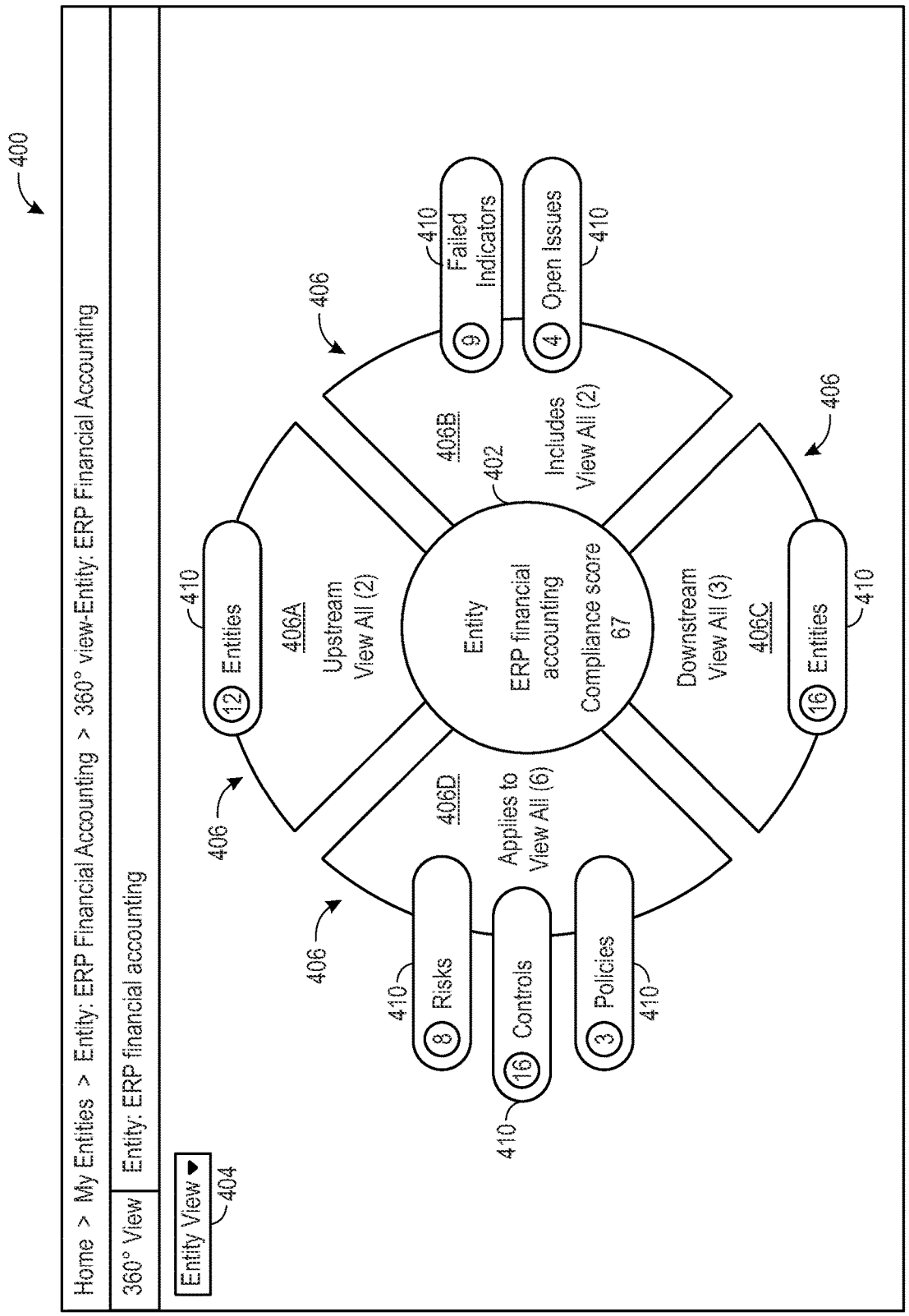
FIG. 6 is an embodiment of the data navigation GUI including a central section corresponding to a data object and additional sections disposed around the central section that correspond to relationship types between the data object and data classifications of other data objects, in accordance with aspects of the present disclosure.

Additionally, the data object portion 340 of the configuration GUI 300 includes a view entry field 346 configured to receive an input indicative of a particular view (e.g., a view name) of the data navigation GUI 400. That is, the configuration GUI 300 may be used to generate multiple views of the data navigation GUI 400 with each view presenting certain data classifications related to a data object and types of relationships between the data object and the data classifications. In FIG. 6, the view may be selected via a view selector 404 of the data navigation GUI 400. In the illustrated embodiment, an "Entity View" is selected/presented, which corresponds to the "Entity" of the view entry field 346 and the table selected via the table entry field 342 of the configuration GUI 300. The view selector 404 may enable selection of other views that present additional and/or different information about the data object. In the context of the enterprise, the other views may include, but are not limited to, a Compliance view, a Risk view, and/or a view showing all data classifications related to a data object. The data object portion 340 also includes a default option 348 that enables a user to set the view as a default view. In the illustrated embodiment, the default option 348 is selected, such that the corresponding Entity view of FIG. 6 may be a default view that is shown for a data object. If the default option 348 is not selected, another view may be a default view, or a default view may not be identified, in which case a user of the data navigation GUI 400 may select an initial view via the view selector 404. The data object portion 340 of the configuration GUI also includes a description field 350 enabling a user to enter or modify a description of the view being created or modified.

Returning to FIG. 4, the client device 20 may receive a view identification 320 (e.g., an input, a view entry, a view selection) via the view entry field 346 of the configuration GUI 300 and a table identification 322 (e.g., an input, a table entry, a table selection) via the table entry field 342 of the configuration GUI 300. Additionally, the client device 20 may receive a section configuration 324 (e.g., an input, section entries, a section configuration selection) via a section portion 360 of the configuration GUI 300. The section portion 360 enables configuration of sections 406 (e.g., sectors) of the data navigation GUI 400 disposed around the central section 402. For example, the section portion 360 includes an orientation field 362 configured to receive an amount and/or an orientation of the sections 406. As illustrated, an option of "Top, bottom, left, and right" is selected via the orientation field 362. Accordingly, the sections 406 of FIG. 6 are oriented to the top of the central section 402, to the bottom of the central section 402, to the left of the central section 402, and to the right of the central section 402. The orientation field 362 may enable identification of other orientations of the sections 406 relative to the central section 402, such as all sections 406 being disposed at one side of the central section 402, or the sections 406 being disposed to the upper left, upper right, lower left, and lower right of the central section 402. Additionally, the orientation field 362 may enable the user to select an amount of the sections 406 to be displayed around the central section 402, such as two sections 406 (see FIG. 16), three sections (see FIG. 15), four sections 406, five sections 406, six sections 406, ten sections 406, or another suitable amount of sections 406.

Additionally, the section portion 360 includes section identification fields 364 that enable identification of the data to be displayed via the sections 406. In the context of the enterprise, the section identification fields 364 may enable identification of relationship types to be displayed via the sections 406. For example, the relationship types of "Upstream", "Downstream", "Applies to", and "Includes" are shown in the section identification fields 364 of FIG. 5. The data navigation GUI 400 of FIG. 6 includes a top section 406A as the Upstream section, a right section 406B as the Includes section, a bottom section 406C as the Downstream section, and a left section 406D as the Applies to section. Furthermore, each section 406 identifies data classifications 410 that are related to the data object of the central section 402 by a respective relationship type and an amount of the data classifications 410. For example, the Entity data object of the central section 402 "Includes" two data classifications 410 of "Failed Indicators" and "Open Issues", as indicated by the right section 406B.

Each data classification 410 may include other data objects related to the data object of the central section 402. Additionally, each data classification 410 may indicate an amount of the other data objects. For example, in FIG. 6, the "Failed indicators" data classification 410 includes nine data objects. Accordingly, a user may readily view an amount of data objects in each data classification 410 via the data navigation GUI 400.

Figure 5:
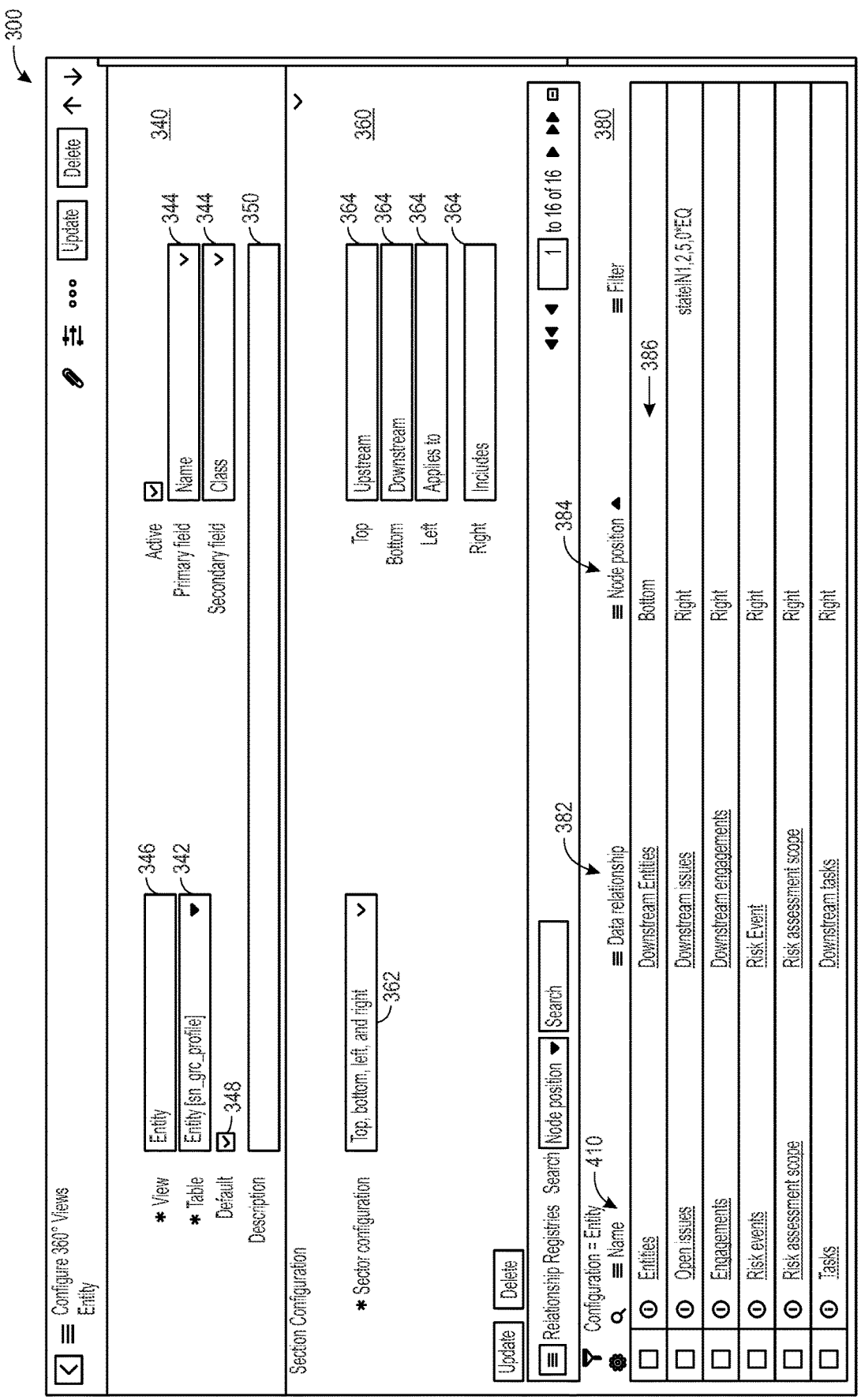
FIG. 5 is an embodiment of the configuration GUI used to display information for configuring a data navigation GUI, in accordance with aspects of the present disclosure.

In certain embodiments, the section identification fields 364 of FIG. 5 may include selectable options of the relationship types, which may be determined by the client device 20 based on the relationships between the tables 310 (e.g., between data objects indicated by the tables 310) of the enterprise database 302. For example, the client device 20 may determine that an "Entity" data object may be upstream of other data objects, downstream of other data objects, apply to other data objects, and include other data objects. Accordingly, a user of the configuration GUI 300 may select which section (e.g., Top, Bottom, Left, Right) will display each of these relationship types indicated by the enterprise database 302. The orientation field 362 and/or one or more of the section identification fields 364 may be a drop-down menu, a search field, a text field, or any combination thereof.

The client device 20 may generate a table 380 of the configuration GUI 300 that presents the data classifications 410 related to the type of data object (indicated via the data object portion 340) by relationship types 382 (indicated via the section portion 360). Additionally, the table 380 indicates a section position 384 (e.g., node position, sector position) of each respective data classification 410. As illustrated via the first row 386 of the table 380, a data classification 410 of "Entities" may be downstream of the Entity data object, as indicated by the Entities data classification 410 shown at the bottom section 402C of the data navigation GUI 400. Accordingly, while configuring the view of the data navigation GUI 400, a user may preview, via the table 380 of the configuration GUI 300, the data classifications 410 to be presented in the data navigation GUI 400.

A user of the configuration GUI 300 may generally include an administrator, such as a network administrator of an enterprise and/or IT personnel of the enterprise. The configuration GUI 300 may enable the user to generate one or more customized views of the data navigation GUI 400 to meet the needs of the enterprise. For example, certain data and relationships between data objects may be useful for a particular department of the enterprise and/or a particular application used by the enterprise, and the user may create a view specifically for that department or application. The view may show a particular type of data object at the central section 402 of the data navigation GUI 400 and/or particular relationship types at the sections 406 disposed around the central section 402. Additionally, the user may copy a previously configured view of the data navigation GUI 400 across departments and/or across applications of the enterprise and make changes to the new, copied view, such that the user does not have to generate a new view from scratch each time a new view is desired.

Figure 7:
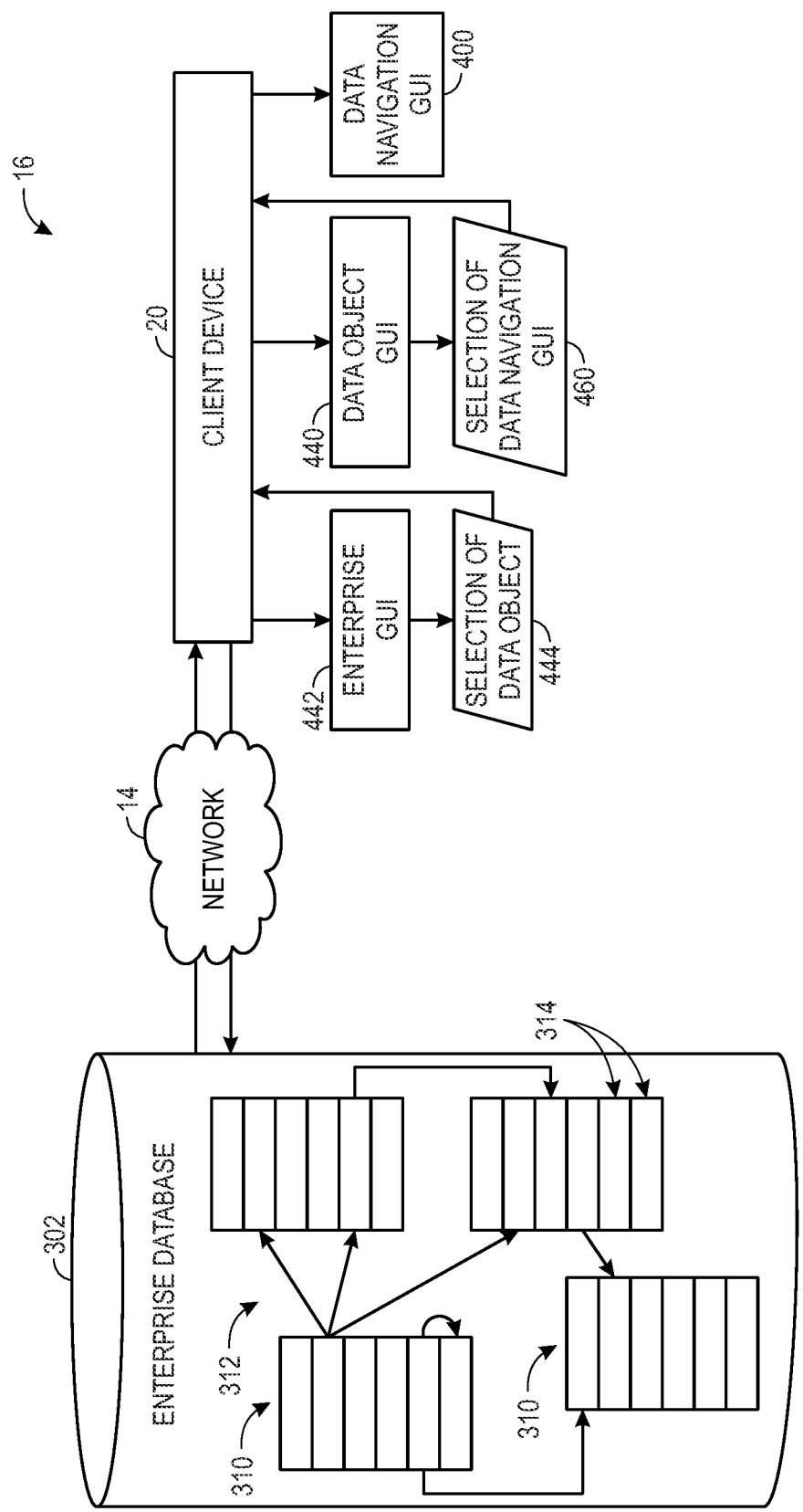
FIG. 7 is a flow diagram illustrating an embodiment in which a client device generates a data object graphical user interface (GUI) that displays information about a data object of an enterprise and that includes a selectable option for viewing the data navigation GUI, in accordance with aspects of the present disclosure.
Figure 8:
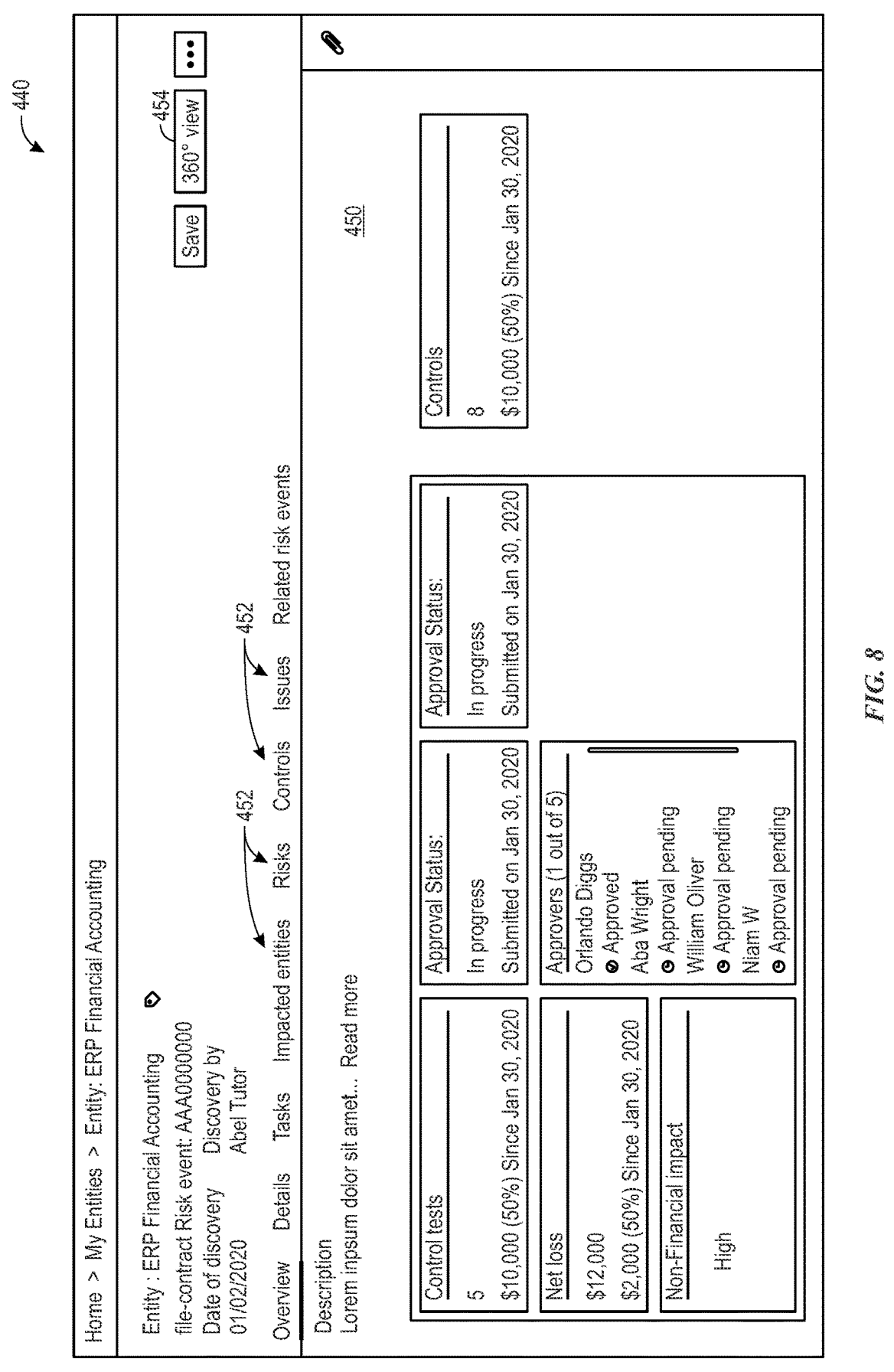

After a view of the data navigation GUI 400 is generated, the view may be presented to other users of the enterprise, such as employees of the enterprise (e.g., employees other than the administrator) and/or other interested parties. FIG. 7 illustrates an embodiment of a flow diagram for navigating to the data navigation GUI 400, in which the client device 20 generates a data object GUI 440 that displays information about a data object of an enterprise and that includes a selectable option for viewing the data navigation GUI 400. An embodiment of the data object GUI 440 is shown in FIG. 8. The client device 20 may initially generate and present an enterprise GUI 442 that enables selection of a particular data object. For example, the enterprise GUI 442 may list or otherwise identify data objects of the enterprise that may be viewable via the data object GUI 440. The data objects may include entities of the enterprise, policies of the enterprise, and controls of the enterprise, among other potential data objects. Accordingly, the client device 20 may receive a data object selection 444 via the enterprise GUI 442.

In response to receiving the data object selection 444, the client device 20 may generate and present the data object GUI 440. As illustrated in FIG. 8, the data object GUI 440 may present information about the selected data object of "Entity: ERP Financial Accounting". The data object GUI 440 includes an overview tab 450 that presents an overview of the data object and additional tabs 452 that present additional information related to the data object. For example, the additional tabs 452 may present information regarding data classifications related to the data object, such as impacted entities and risks. A user viewing the data object GUI 440 may view and determine information about the data object, such as by viewing the overview tab 450 and selecting one or more of the additional tabs 452. As the user navigates the data object GUI 440, certain relationships between the data object and data classifications may not be apparent, or the user may not be able to identify certain other data objects related to the data object (e.g., other data objects related to "Entity: ERP Financial Accounting" in the illustrated embodiment of FIG. 8). Accordingly, the user may select a data navigation option 454 (e.g., a selectable option) to view and interact with the data navigation GUI 400 of FIG. 6. For example, returning to FIG. 7, the client device 20 may receive a data navigation GUI selection 460, and in response, present the data navigation GUI 400, such as the data navigation GUI of FIG. 6.

Figure 9:
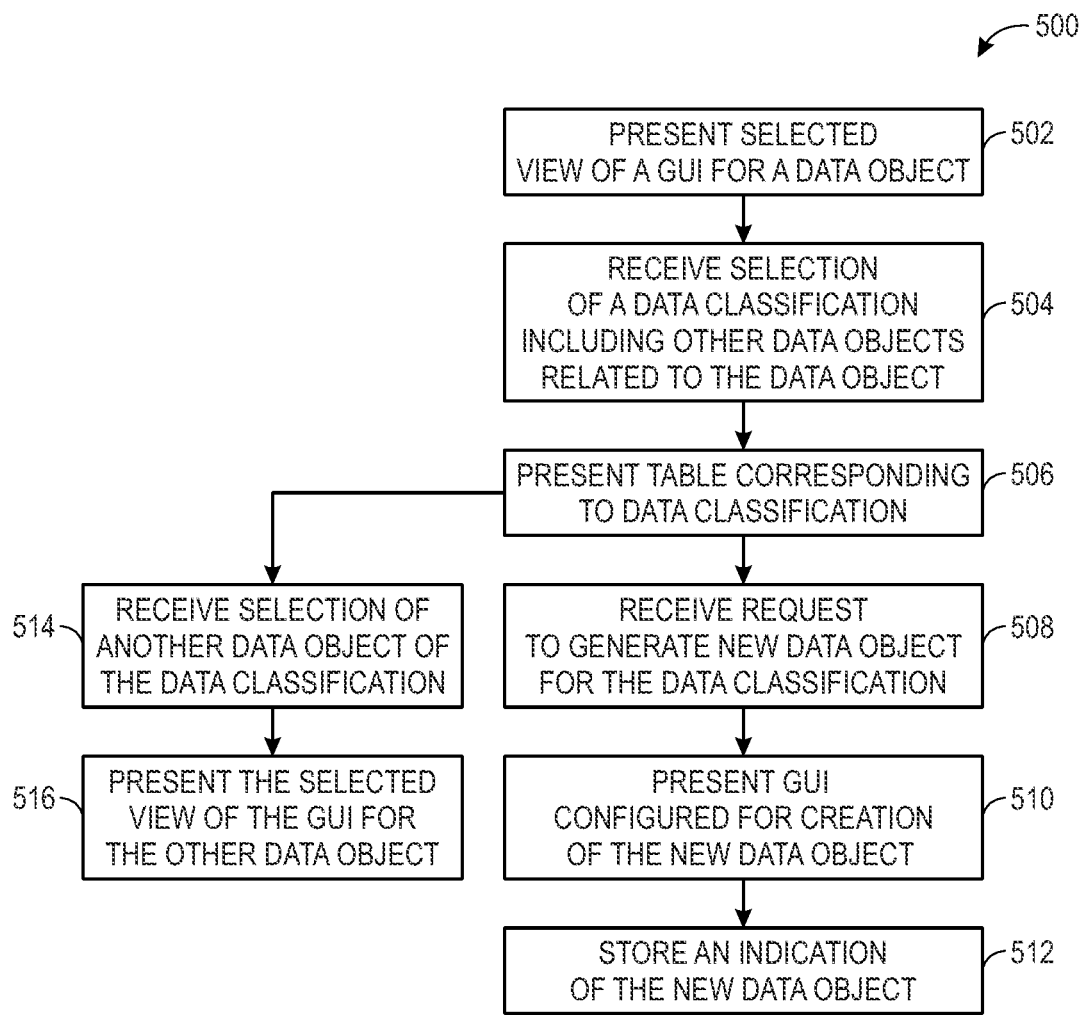
FIG. 9 is a process flow diagram illustrating an embodiment for navigating the data navigation GUI, including options for generating a new data object and presenting information associated with an additional data object, in accordance with aspects of the present disclosure.

With the foregoing in mind, FIG. 9 depicts a process 500 for navigating the data navigation GUI 400. The following description of the process 500 will be described as being performed by the client device 20, but it should be noted that any suitable processor-based device may be specially programmed to perform any of the methods described herein. Moreover, although the following description of the process 500 is described as including certain steps performed in a particular order, it should be understood that the steps of the process 500 may be performed in any suitable order, that certain steps may be omitted, and/or that certain steps may be added.

At block 502, the client device 20 may present a selected view of the data navigation GUI 400. For example, the client device may present the Entity view shown in FIG. 6 in response to receiving a selection of the Entity view via the view selector 404. In certain embodiments, the client device 20 may present a default view as the selected view, such as the Entity view or another suitable view.

Figure 10:
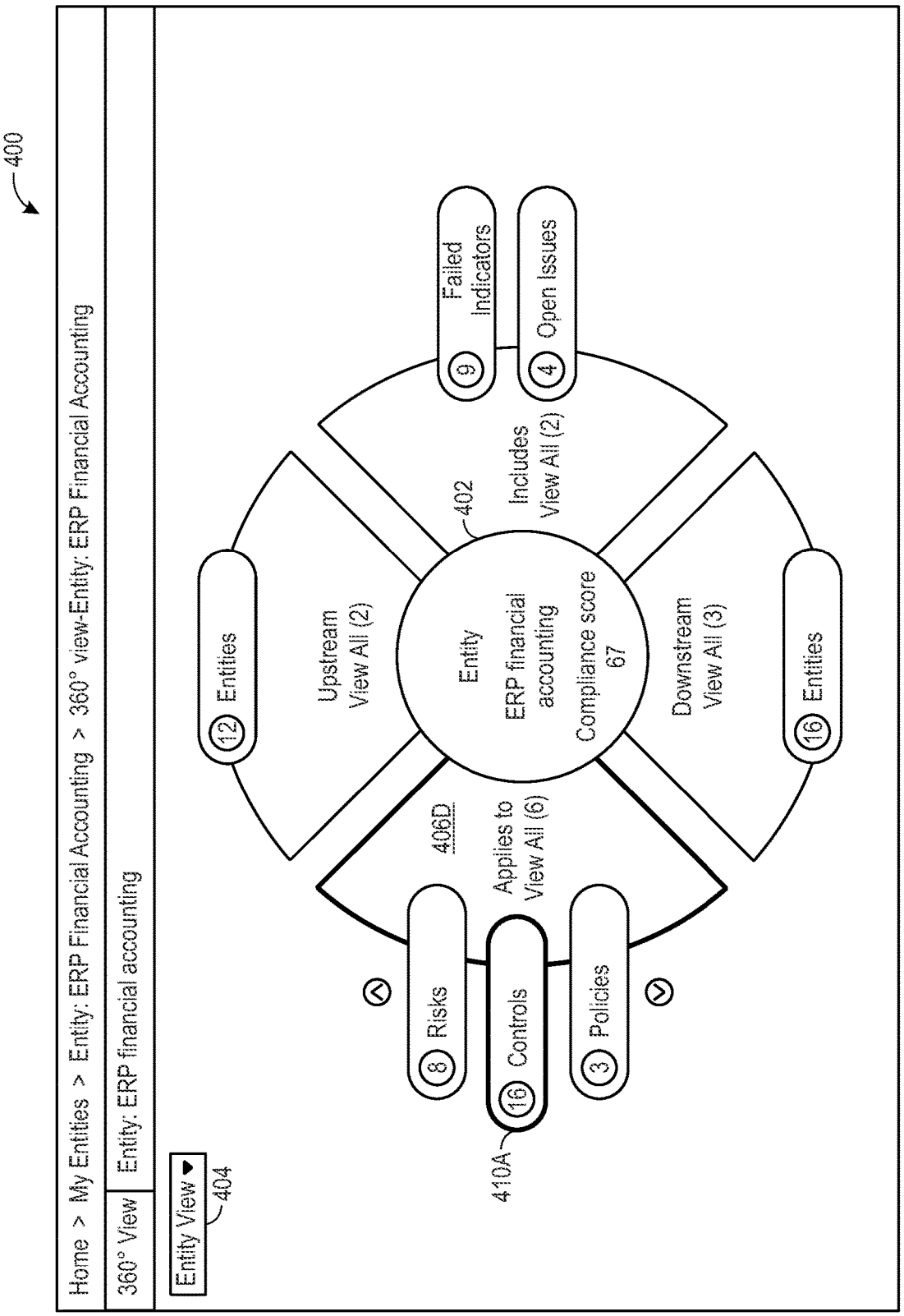
FIG. 10 is the data navigation GUI of FIG. 6 including a highlighted relationship type and a highlighted data classification corresponding to the relationship type, in accordance with aspects of the present disclosure.

After presenting the view of the data navigation GUI 400, a user may view and/or interact with portions of the data navigation GUI 400, such as the central section 402 representing the data object, the sections 406 representing the relationship types, the data classifications 410, and the view selector 404. At block 504, the client device 20 may receive a selection of a data classification 410. As illustrated in FIG. 10, a "Controls" data classification 410A is selected. The box representing the data classification 410A and the section 402D representing the "Applies to" relationship type are highlighted to illustrate the selection.

Figure 11:
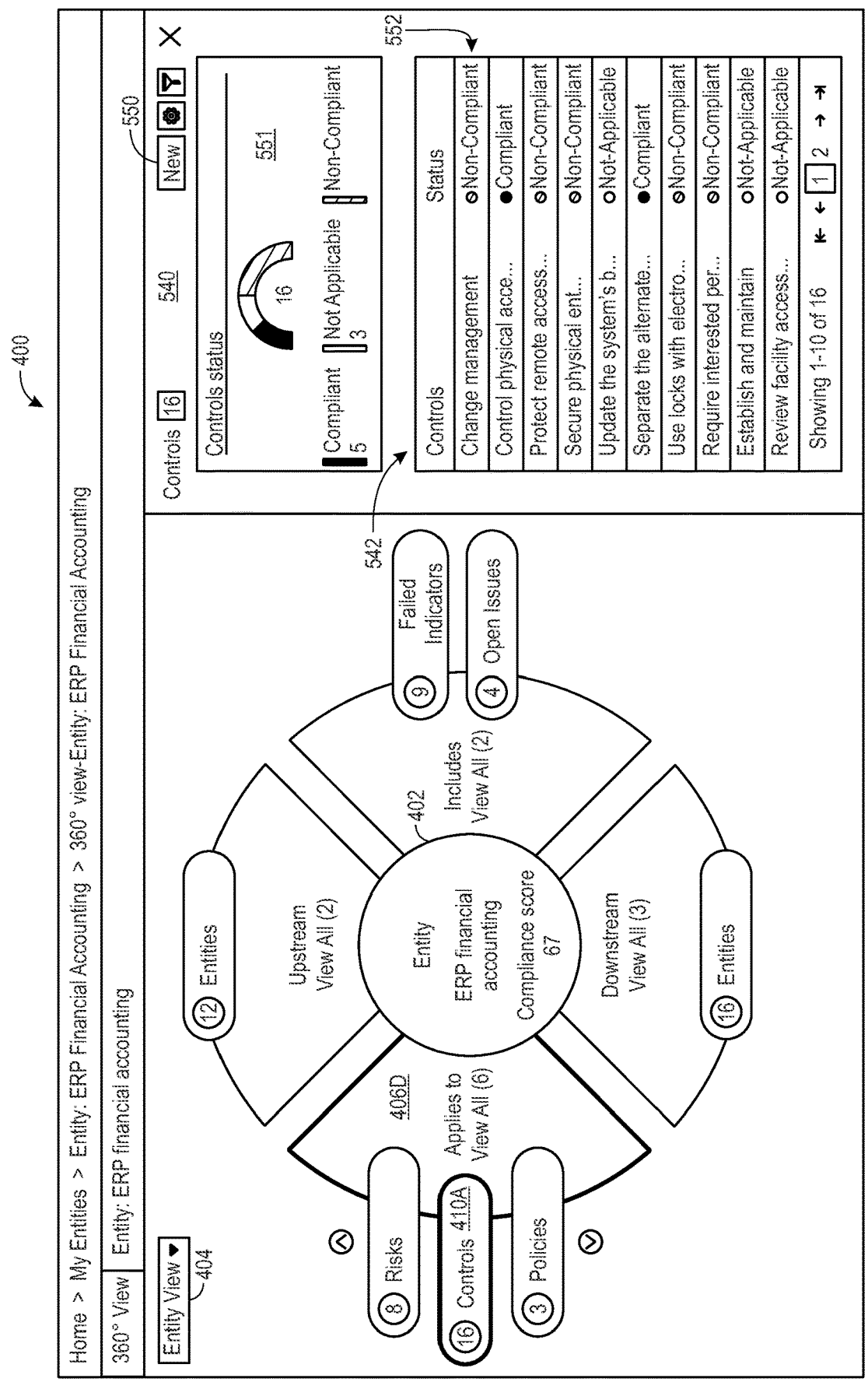
FIG. 11 is the data navigation GUI of FIG. 10 including a table indicating data objects included in the highlighted data classification, in accordance with aspects of the present disclosure.

In response to receiving the selection of the data classification 410, the client device 20 may present, via the data navigation GUI 400, a table corresponding to the selected data classification 410, as indicated by block 506. The table may indicate other data objects related to the data object of the central section 402. For example, FIG. 11 illustrates a table 540 of the data navigation GUI 400 that may indicate other data objects 542 that are related to the data object of the central section 402. More specifically, the table 540 identifies individual controls for the entity indicated by the central section 402 and a compliance status of each control. Additionally, as indicated by the relationship type of section 406D, the other data objects 542 of the table 540 may "Apply to" the data object of the central section 402, or vice versa. Accordingly, the user may select the data classification 410A to view, via the table 540, the other data objects 542 (e.g., the controls and their associated compliance statuses).

Returning to FIG. 9, at block 508, the client device 20 may receive a request to generate a new data object for the selected data classification. For example, in reference to FIG. 11, the data navigation GUI 400 may include a new data object option 550 that enables generation of a new data object for the data classification 410A (e.g., for the selected data classification). In the illustrated embodiment, the user may select the new data object option 550 to create a new control in the controls data classification 410A and/or to set a status for the new control. In response to receiving the request to generate the new data object, the client device may present a new data object GUI configured for creation of the new data object, as indicated by block 510 of FIG. 9. The new data object GUI may facilitate generation of a data object, such as by enabling entry and/or selection of data for the new data object. In the example of the controls data classification 410A, the new data object GUI may enable identification of the new control to be associated with the entity of the central section 402, limits associated with the new control, and/or other suitable controls data. At block 512, the client device 20 may store an indication of the new data object, such as by generating and storing record(s) indicating the new data object in the enterprise database 302. In some embodiments, the data navigation GUI 400 may include a selectable option(s) enabling deletion of a data object from a data classification and/or transfer of the data object from one data classification to another data classification.

In certain embodiments, the data navigation GUI 400 may present additional information associated with the selected data classification. For example, the table 540 includes a Controls status graphic 551 that provides a graphical summary of the other data objects 542 (e.g., a summary of the controls and their associated compliance statuses). In response to selections of other data classifications 410, the table 540 may include other graphical summaries, such as a summary of risks, policies, and other entities associated with the data object indicated by the central section 402.

Figure 12:
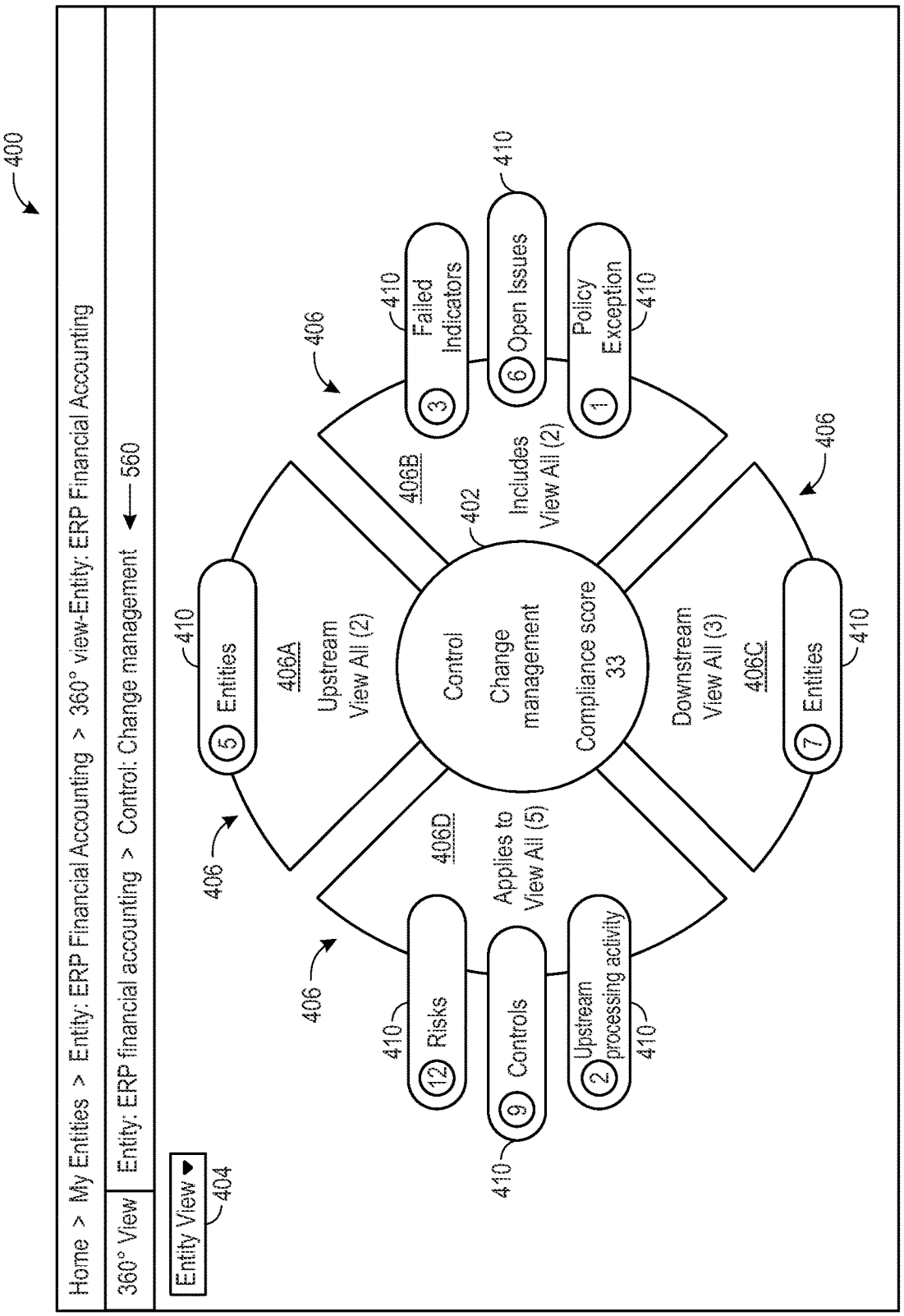
FIG. 12 is an embodiment of the data navigation GUI including a central section corresponding to another data object selected from the table of data objects of FIG. 11, in accordance with aspects of the present disclosure.

Additionally, the client device 20 may receive a selection of another data object of the data classification, as indicated by block 514, and present the view of the data navigation GUI 400 for the other data object, as indicated by block 516. In the context of FIG. 11, a user may select one of the other data objects 542 of the table 540, such as a change management data object 552. In response, the client device 20 may update the data navigation GUI 400 (e.g., generate an additional representation of the data navigation GUI 400) presenting the change management data object 552 at the central section 402, as illustrated in FIG. 12. The data navigation GUI 400 remains in the Entity view, as indicated by the view selector 404, and the central section 402 is updated to present the change management data object 552. Additionally, the updated data navigation GUI 400 includes the same sections 406 relative to the embodiment of FIG. 11 but with different data classifications 410. In particular, the data classifications 410 may be updated based on the other data objects associated with the change management data object 552 and the types of relationships between the other data objects and the change management data object 552. Accordingly, the data navigation GUI 400 may dynamically update the displayed data object, data classifications, and relationship types as the user selects new data objects, thereby enhancing the user's understanding of the data objects and the relationships between the data objects.

The data navigation GUI 400 also includes a navigation path 560 that enables viewing and tracking of data objects navigated via the data navigation GUI 400. That is, the navigation path 560 indicates the previously viewed data object "Entity: ERP financial accounting", as shown in the data navigation GUI 400 of FIGS. 6, 10, and 11, as well as the current data object "Control: Change management". Each of the data objects indicated by the navigation path 560 may be selectable, and the data navigation GUI 400 may revert to a previously viewed data object in response to a selection of the data object. For example, in response to receiving a selection of the "Entity: ERP financial accounting" data object, the client device 20 may generate and present the embodiment of the data navigation GUI 400 shown in FIG. 6. Accordingly, the user may navigate through several (e.g., two, three, four, five, six, ten, twenty, one hundred) data objects and backtrack to a previously viewed data object by simply selecting the previously viewed data object via the navigation path 560.

In certain embodiments, the sections 406 may be selectable, and the data navigation GUI 400 may present all data classifications 410 related to the data object by the relationship type represented by the selected section 406. For example, the data navigation GUI 400 may limit the number of data classifications 410 presented for each section 406 (e.g., for each relationship type) to avoid cluttering the data navigation GUI 400. In particular, the data navigation GUI 400 may present only the data classifications 410 having the highest number of other data objects and/or having a threshold number of data objects. In some embodiments, a user (e.g., an administrator), via the configuration GUI 300, may set the maximum number of data classifications 410 to be presented for each section 406, which data classifications 410 are to be presented for each section 406, and/or the threshold number of data objects required for a data classification 410 to be presented for each section 406.

Figure 13:
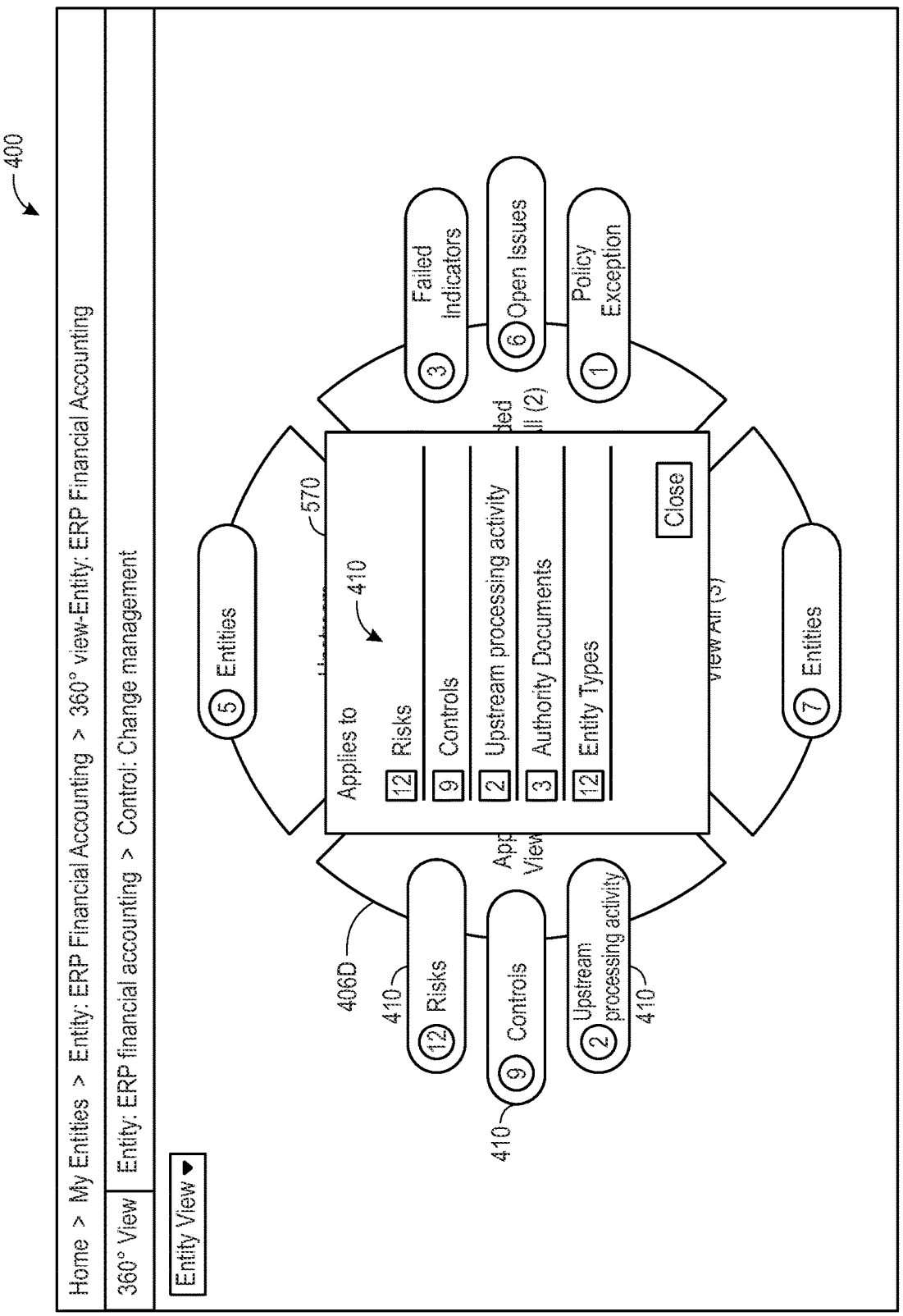
FIG. 13 is an embodiment of the data navigation GUI of FIG. 12 including a window presenting all data classifications for a particular relationship type, in accordance with aspects of the present disclosure.

In the illustrated embodiment of FIG. 12, the section 406D indicates that there are five total data classifications 410 that "Apply to" the change management data object 552. However, only three data classifications 410 are presented in FIG. 12. To view all data classifications 410 associated with the change management data object 552 by the "Apply to" relationship type, a user may select the section 406D. As shown in FIG. 13, in response to receiving a selection of the section 406D, the client device 20 may generate and present a window 570 indicating all data classifications 410 that "Apply to" the change management data object 552. The data classifications 410 include Risks, Controls, Upstream processing activity, as indicated by the data navigation GUI 400 of FIG. 12, and additional data classifications 410 including Authority documents and Entity types. Accordingly, a user may view all data classifications 410 for a particular relationship type by simply selecting the corresponding section 406 of the data navigation GUI 400.

Figure 14:
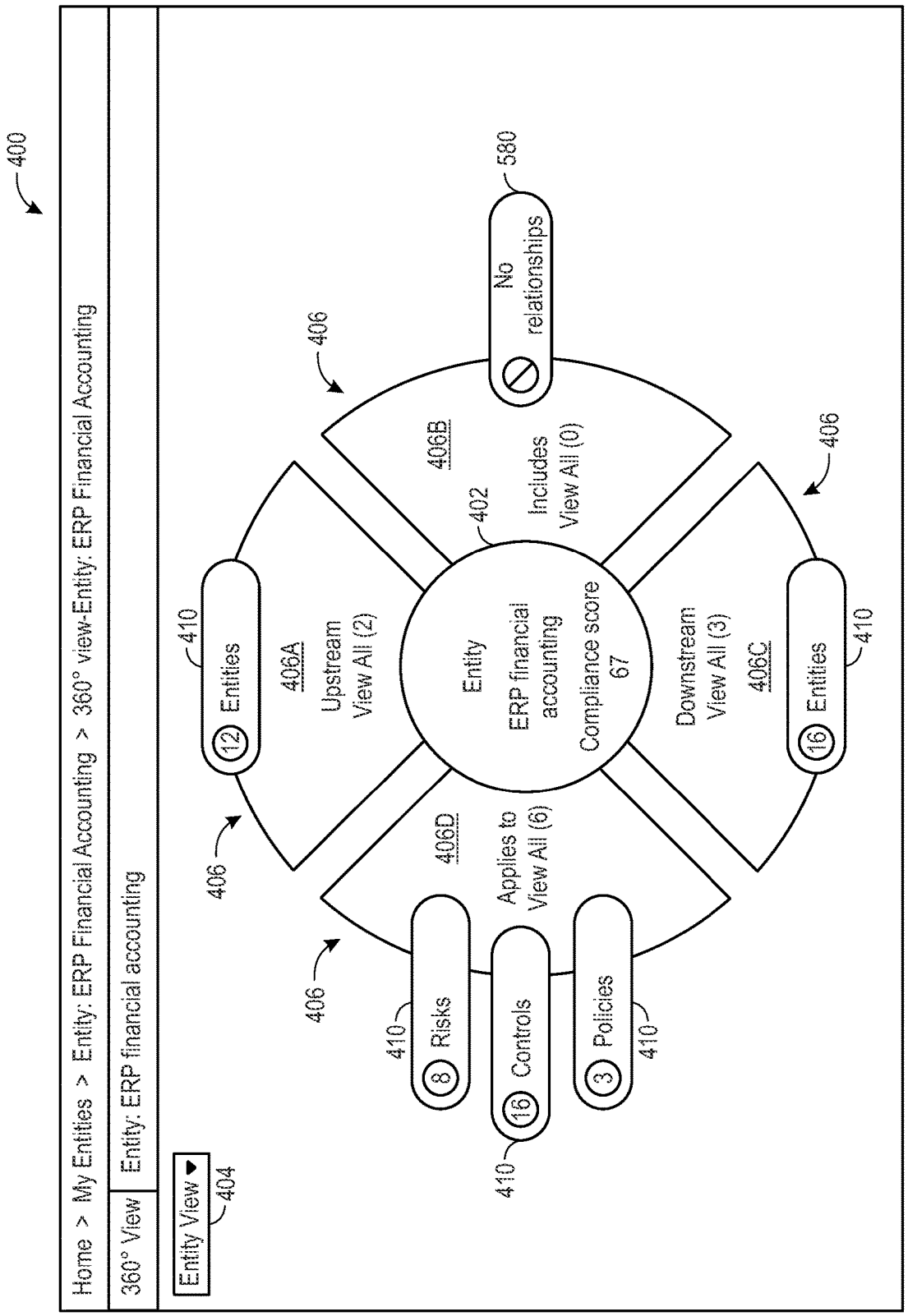
FIG. 14 is an embodiment of the data navigation GUI including the central section corresponding to the data object and additional sections disposed around the central section including an additional section with no data classifications, in accordance with aspects of the present disclosure.

In certain embodiments, the data object indicated at the central section 402 may not be related to other data objects by a particular relationship type. For example, in FIG. 14, the "Entity: ERP financial accounting" data object is presented at the central section 402, and the section 406B corresponds to an "Includes" relationship type. However, the "Entity: ERP financial accounting" data object may not include other data objects, such that the section 406B includes a no relationships indication 580. As such, the data navigation GUI 400 may present to the user that a particular data object is not related to other data classifications and data objects by a particular relationship type.

Figure 15:
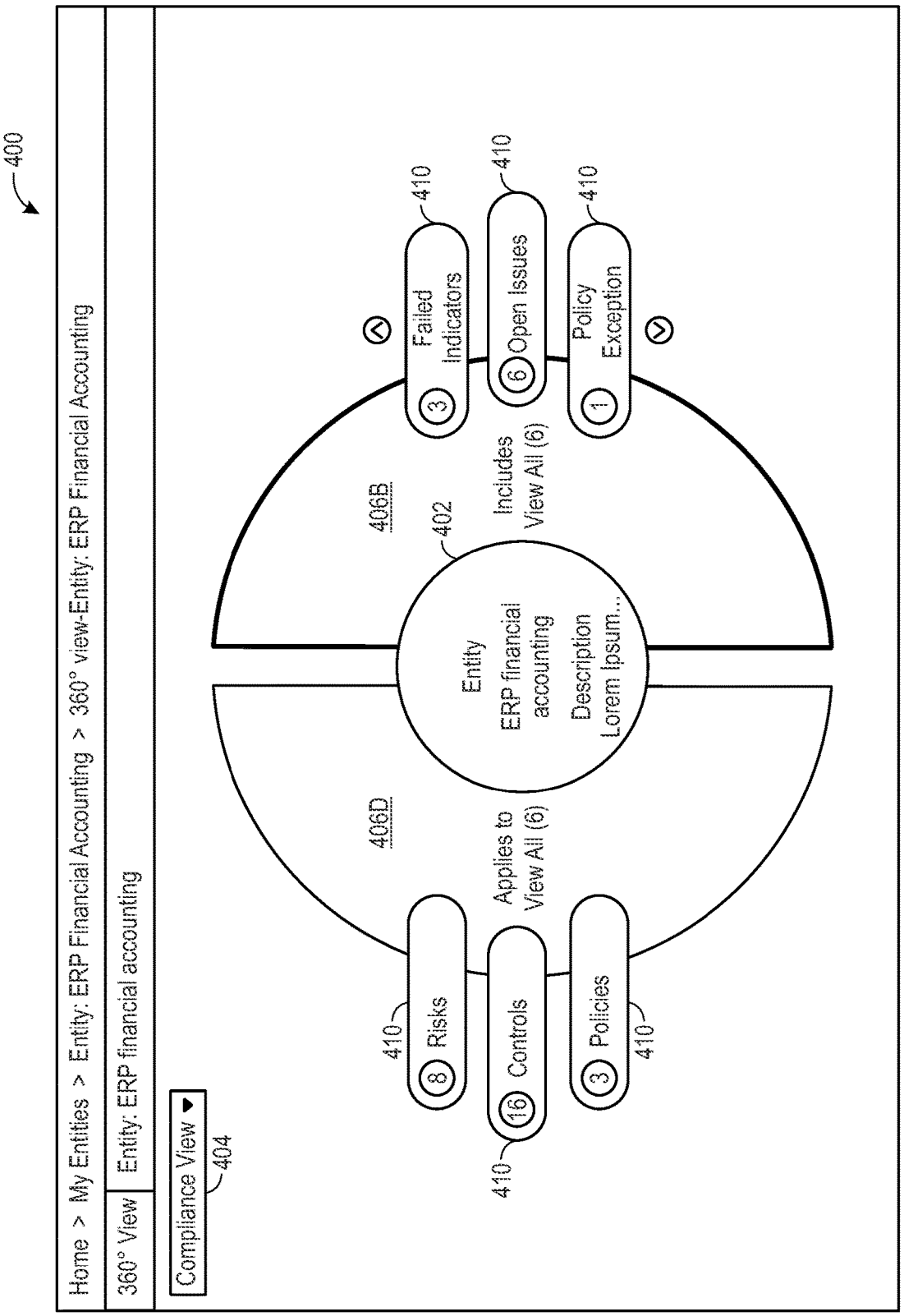
FIG. 15 is an embodiment of the data navigation GUI including the central section corresponding to the data object and two additional sections disposed around the central section that correspond to relationship types between the data object and data classifications of other data objects, in accordance with aspects of the present disclosure.
Figure 16:
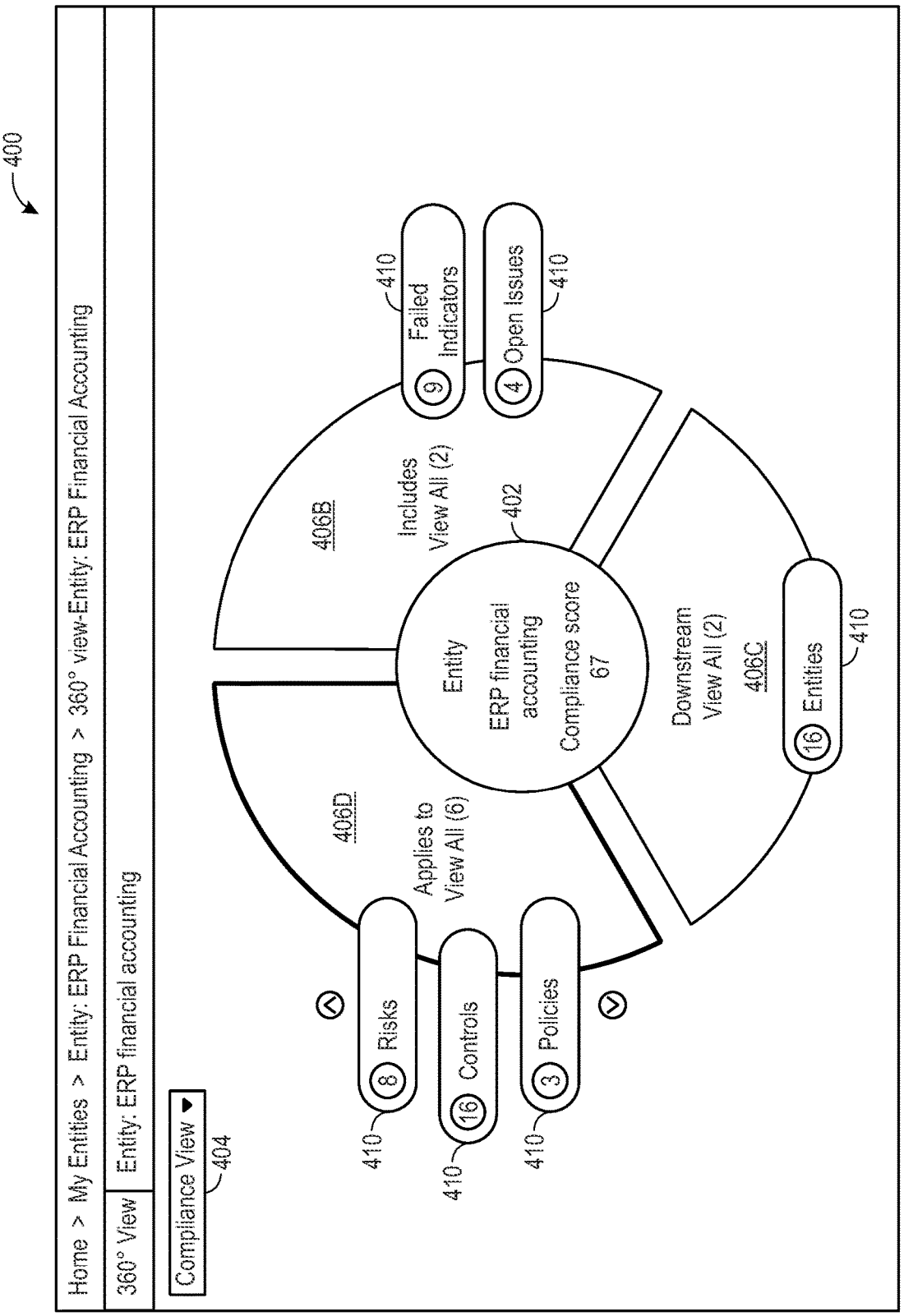
FIG. 16 is an embodiment of the data navigation GUI including the central section corresponding to the data object and three additional sections disposed around the central section that correspond to relationship types between the data object and data classifications of other data objects, in accordance with aspects of the present disclosure.

As described above, the view selector 404 may enable selection of one or more other views in addition to Entity view of FIGS. 6 and 10-14. Additionally, the configuration GUI 300 may enable configuration of such views. FIG. 15 illustrates an embodiment of a Compliance view of the data navigation GUI 400. The Compliance view includes two sections 406 disposed around the central section 402. More specifically, the Compliance view includes the section 406B corresponding to the "Includes" relationship type and the section 406D corresponding to the "Applies to" relationship type. A user may switch between the views described herein, such as the Entity view, Compliance view, Risk view, All Relationships view, and/or another suitable view, to enhance the user's understanding of the data objects and relationships between the data objects.

Additionally, as described in reference to the configuration GUI 300 of FIG. 5, the data navigation GUI 400 may include any suitable number of sections 406. For example, the Compliance view of FIG. 15 includes two sections 406. In contrast, the embodiment of the data navigation GUI 400 of FIG. 16 includes a Compliance view with three sections 406. Accordingly, a user (e.g., an administrator) may configure the data navigation GUI 400 and each view of the data navigation GUI 400 to present a particular amount of sections 406 around the central section 402 (e.g., a particular amount relationship types between a data object of the central section 402 and the data classifications 410).

Figure 17:
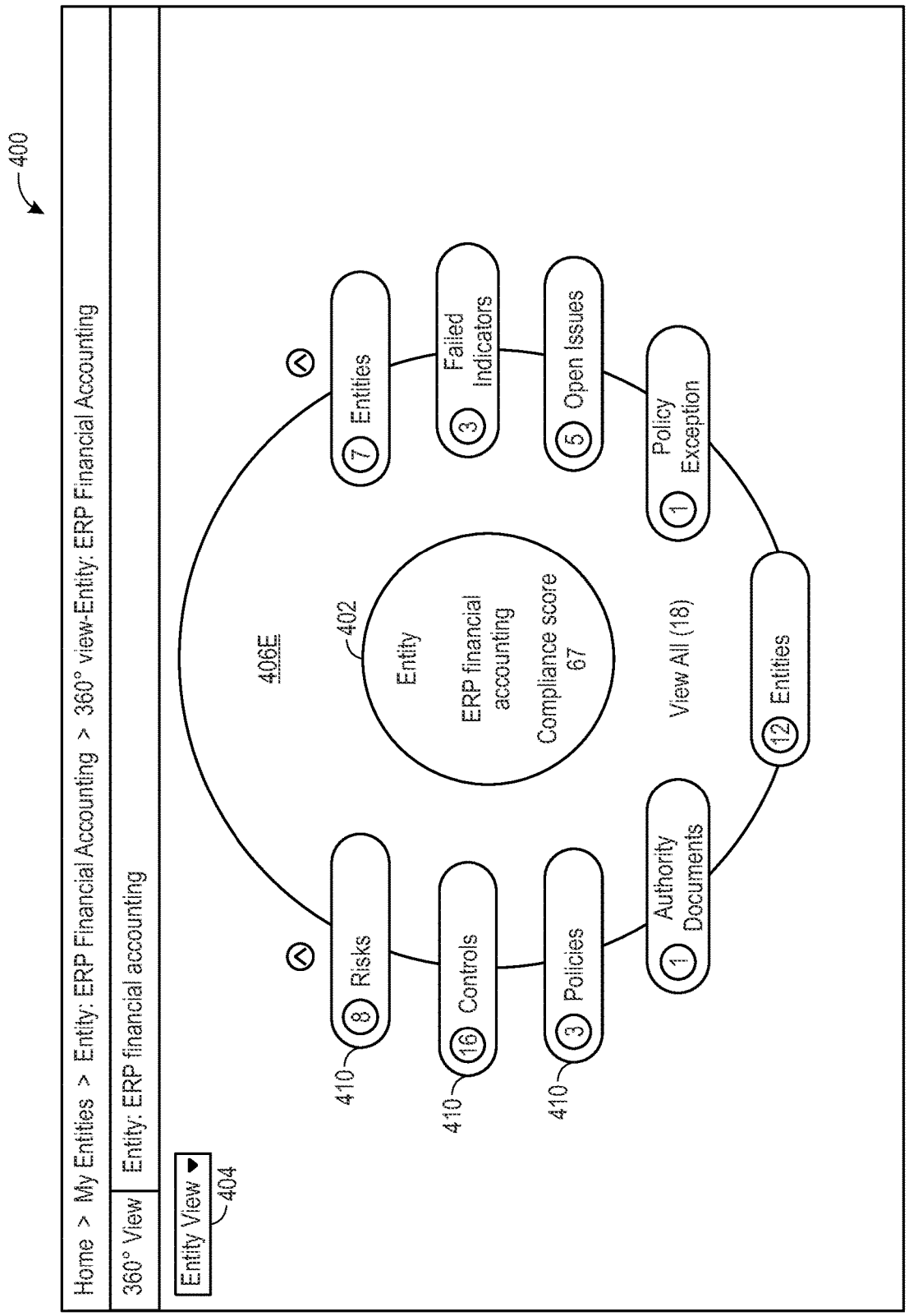
FIG. 17 is an embodiment of the data navigation GUI including the central section corresponding to the data object and one additional section disposed around the central section that indicates data classifications of other data objects related to the data object, in accordance with aspects of the present disclosure.

In certain embodiments, as shown in FIG. 17, the data navigation GUI 400 may present a single section 406E disposed around the central section 402 without identifying the relationship types between the data classifications 410 and the data object of the central section 402. In some embodiments, the data navigation GUI 400 may include a selectable option that causes the data navigation GUI 400 to present the embodiment of FIG. 17 without the relationship types identified. In certain embodiments, the configuration GUI 300 may enable configuration of the embodiment of FIG. 17, which may be identified as a particular view that is selectable via the view selector 404.

As described and shown herein, the central section 402 is generally circular, and the sections 406 are disposed around the central section 402 in a circular pattern. In certain embodiments, the central section 402 and/or the section 406 may be other suitable shapes and/or patterns, such as triangles, squares, pentagons, hexagons, heptagons, octagons, ovals, ellipses, and/or other suitable shapes. Additionally, while the data classifications 410 are illustrated as capsules or "pills" (e.g., spherocylinders), the data classifications 410 may also be one or more other suitable shapes.

Additionally, while the database 302, the configuration GUI 300, and the data navigation GUI 400 are primarily described in the context of an enterprise, the present disclosure may have other applications, such as factory management. For example, the data navigation GUI 400 may be used to view and manage a flow of resources within a factory and products output by the factory, and the configuration GUI may be used to generate views for the data navigation GUI 400.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computer-implemented method of generating a graphical user interface (GUI), comprising:
   receiving an indication of a selected view of the GUI from a plurality of views and an indication of a data object related to an enterprise;
   identifying one or more data classifications related to the data object and one or more relationship types between the data object and the one or more data classifications;
   generating the selected view of the GUI for the data object, wherein the selected view of the GUI comprises:
      a central section indicating the data object; and
      one or more user selectable sections disposed around the central section, wherein the one or more user selectable sections are configured to display, on the GUI:
         the one or more data classifications, and
         the one or more relationship types between the data object and the one or more data classifications,
      and wherein the one or more user selectable sections, when selected, are configured to update the GUI to display an updated data object in the central section and additional information of the one or more data classifications and the one or more relationship types in respective views corresponding to hierarchical structures associated with the one or more user selectable sections, wherein a respective table is created and displayed on the GUI when an option in one of the one or more user selectable sections is selected, wherein the respective table comprises an entry associated with the updated data object and other entries associated with other data objects related to the updated data object, and wherein the entry and the other entries are selectable by a user via the GUI to update the central section.

2. The computer-implemented method of claim 1, wherein identifying the one or more data classifications related to the data object and the one or more relationship types between the data object and the one or more data classifications comprises:
   determining a particular table including one or more records corresponding to the data object; and
   identifying the one or more relationship types based on one or more relationships between the particular table and one or more other tables, wherein the one or more other tables include one or more other records corresponding to the one or more data classifications.

3. The computer-implemented method of claim 2, wherein the one or more relationships are between a record of the one or more records and an additional record of the one or more other records.

4. The computer-implemented method of claim 1, wherein each section of the one or more user selectable sections indicates a respective relationship type of the one or more relationship types, at least one data classification of the one or more data classifications, and an amount of other data objects for each data classification of the one or more data classifications.

5. The computer-implemented method of claim 4, wherein each section of the one or more user selectable sections indicates an amount of data classifications of the one or more data classifications for the respective relationship type.

6. The computer-implemented method of claim 1, wherein the central section comprises a circular section, and wherein the one or more user selectable sections are disposed in a circular pattern around the circular section.

7. The computer-implemented method of claim 1, comprising:
   presenting the GUI via a client device.

8. The computer-implemented method of claim 1, wherein the GUI is updated to display the updated data object in the central section when the entry associated with the updated data object is selected.

9. A method of navigating a graphical user interface (GUI), comprising:
   receiving an indication of a selected view of the GUI from a plurality of views and an indication of a data object related to an enterprise;
   generating the selected view of the GUI for the data object, wherein the selected view of the GUI comprises:
      a central section configured to display information about the data object; and
      one or more user selectable sections disposed around the central section, wherein the one or more user selectable sections are configured to display, on the GUI, one or more relationship types between the data object and one or more data classifications,
      and wherein the one or more user selectable sections, when selected, are configured to update the GUI to display an updated data object in the central section and additional information of the one or more data classifications and the one or more relationship types in respective views corresponding to hierarchical structures associated with the one or more user selectable sections, wherein a respective table is created and displayed on the GUI when an option in one of the one or more user selectable sections is selected, wherein the respective table comprises an entry associated with the updated data object and other entries associated with other data objects related to the updated data object, and wherein the entry and the other entries are selectable by a user via the GUI to update the central section.

10. The method of claim 9, comprising:
    receiving an indication of a selected data classification of the one or more data classifications; and
    presenting the respective table, via the GUI, corresponding to the selected data classification, wherein the respective table indicates one or more other data objects related to the data object.

11. The method of claim 10, comprising:
    receiving an indication of a selected other data object of the one or more other data objects; and
    presenting the selected view of the GUI for the selected other data object.

12. The method of claim 10, wherein the respective table comprises a selectable option for generating a new data object for the selected data classification.

13. The method of claim 9, comprising:
    receiving an indication of an additional selected view of the GUI from the plurality of views;
    generating the additional selected view of the GUI for the data object, wherein the additional selected view indicates at least relationship type between the data object and an additional data object that is different than the one or more relationship types indicated by the selected view; and
    presenting the additional selected view of the GUI for the data object.

14. The method of claim 9, wherein each section of the one or more user selectable sections indicates an amount of data classifications of the one or more data classifications for a respective relationship type of the one or more relationship types.

15. The method of claim 9, wherein the GUI is limited to presenting a particular amount of data classifications of the one or more data classifications for each relationship type of the one or more relationship types, and comprising:
- receiving an indication of a selected relationship type of the one or more relationship types;
- generating a window indicating all data classifications related to the data object by the selected relationship type; and
- presenting the window via the GUI.

16. The method of claim 9, comprising:
- presenting the selected view of the GUI for the data object.

17. The method of claim 9, wherein the GUI is updated to display the updated data object in the central section when the entry associated with the updated data object is selected.

\* \* \* \* \*